United States Patent [19]

Nozawa et al.

[11] Patent Number: 4,513,234
[45] Date of Patent: Apr. 23, 1985

[54] METHOD AND APPARATUS FOR CONTROLLING ZERO-POINT RETURN OF A MOVABLE ELEMENT

[75] Inventors: Ryoichiro Nozawa, Tokyo; Nobuyuki Kiya, Hachioji, both of Japan

[73] Assignee: Fujitsu Fanuc Limited, Minamitsuru, Japan

[21] Appl. No.: 388,925

[22] Filed: Jun. 16, 1982

[30] Foreign Application Priority Data

Jun. 16, 1981 [JP] Japan .................................. 56-92798

[51] Int. Cl.³ .............................................. G05B 11/18
[52] U.S. Cl. ..................................... 318/594; 318/592; 318/593
[58] Field of Search ................................ 318/592-596

[56] References Cited

U.S. PATENT DOCUMENTS

| | | | |
|---|---|---|---|
| 3,953,774 | 4/1976 | Sato et al. | 318/594 |
| 3,976,929 | 8/1976 | Rodier | 318/594 |
| 3,995,206 | 11/1976 | Aronstein | 318/594 X |
| 4,085,890 | 4/1978 | Kimura et al. | |
| 4,166,970 | 9/1979 | Cardot | 318/594 |
| 4,225,928 | 9/1980 | Ohkubo | 318/594 X |
| 4,312,033 | 1/1982 | Sweeney et al. | 318/594 X |

FOREIGN PATENT DOCUMENTS

| | | |
|---|---|---|
| 2306789 | 5/1976 | France . |
| 2346760 | 10/1977 | France . |
| 1425322 | 2/1976 | United Kingdom . |

*Primary Examiner*—B. Dobeck
*Attorney, Agent, or Firm*—Staas & Halsey

[57] ABSTRACT

A method and apparatus for controlling the return of a movable element of a machine tool to a predetermined grid point by controlling a movable element drive device in accordance with feedback pulses generated while the drive device is being driven to transport the movable element between grid points. The method includes the steps of specifying a position remote from the predetermined grid point by a distance which is less than the spacing between grid points, computing the deviation between the specified position and the current position of the movable element, positioning the movable element at the specified position by driving the drive device on the basis of the computed deviation and the feedback pulses, and driving the drive device at reduced speed to stop the movable element at the first grid point encountered following the initiation of reduced-speed drive.

5 Claims, 6 Drawing Figures

METHOD AND APPARATUS FOR CONTROLLING ZERO-POINT RETURN OF A MOVABLE ELEMENT

BACKGROUND OF THE INVENTION

This invention relates to a method and apparatus for returning a movable element of a machine tool to a machine zero point and, more particularly, to a zero-point control method and apparatus in which a dog and limit switch are not required.

Reference will first be had to FIGS. 1 and 2 to describe, in general terms, a conventional zero-point return operation in a numerically controlled machine tool in which a zero-point return dog DG and deceleration limit switch DLS are required. In this case, as shown in FIG. 1, we will assume that the zero-point return dog DG is provided on the movable element, namely a table TB, of the machine tool, and that the deceleration limit switch DLS is provided in close proximity to the zero point of a stationary portion MC of the machine tool. When the system is placed in the zero-point return mode, the table TB is quick-fed at a speed $V_R$ toward the zero point. At time $t_1$ (FIG. 2), when the dog DG reaches the vicinity of the zero point and actuates the deceleration limit switch DLS, an X-axis deceleration signal XDL produced by the limit switch goes to logical "1", as shown in FIG. 2. The zero-point return speed is reduced in response to the leading edge of the deceleration limit signal XDL and may follow either the solid or dotted line. In the case of the solid line, the zero-point return speed attains a value of $V_L$ after a predetermined period of time, namely at time $t_2$, which speed is low enough for the drive motor to be stopped instantaneously. In the case of the dotted line, the zero-point return speed first drops to zero at time $t_2$ and then is elevated to the speed $V_L$. Then, in both cases, the table TB is moved toward the zero point at the speed $V_L$ from said point in time $t_2$. Since the dog DG separates from the deceleration limit switch at time $t_3$, the limit switch is restored to its original state, so that the deceleration signal XDL reverts to logical "0". When the deceleration limit switch DLS is restored to its original state, the numerical control device considers the very next grid point encountered to be the zero point, whereby the numerical control device stops the table TB at time $t_4$ (at grid point $G_o$) to end the zero-point return operation.

FIG. 3 is a circuit block diagram which is useful in describing the conventional zero-point return control method.

When a zero-point return command ZRN is logical "0", a first reversible counter $RCN_1$ has its content incremented each time command pulse CP arrives from a numerical control device NC through an AND gate $AN_1$. The output of counter $RCN_1$ is applied to a digital-to-analog converter DAC which generates a voltage proportional to the value of the count within the counter. The analog voltage, amplified by a power amplifier AMP, rotates a servo motor M to drive a table T through a ball screw BS connected to the rotary shaft of the servo motor. A rotary encoder RE, connected to the shaft of the servo motor M to rotate in unison therewith, generates a feedback pulse FBP each time it rotates by a predetermined amount, as well as a one-revolution pulse PC each time it completes one full revolution. The table positions at which the one-revolution pulse is generated are the grid points referred to above.

Thus, the rotary encoder RE serves to sense the amount of motor rotation and generates the feedback pulses FBP as an indication of this amount. The feedback pulses FBP are applied to the down-count terminal of the first reversible counter $RCN_1$ to decrement its content. When the command pulses CP stop arriving from the numerical control device NC and the number of feedback pulses FBP generated reaches a value equal to the total number of command pulses CP applied to the reversible counter $RCN_1$, the content of the counter attains a value of zero, thereby stopping the servo motor M. This completes the positioning of the table T.

The command pulses CP generated by the numerical control device NC are also applied to the up-count terminal of a second reversible counter $RCN_2$ through the AND gate $AN_1$, whereby the command pulses are counted. A flip-flop $FF_3$ is in the reset state from the time power is introduced to the circuit until the generation of the first one-revolution pulse PC. During this interval, therefore, the feedback pulses FBP generated by the rotary encoder RE are fed through an AND gate $AN_5$ to the down-count terminal of the second reversible counter $RCN_2$ to decrement the content of the counter. When the first one-revolution pulse PC is generated following the introduction of power, however, the content of counter $RCN_2$ at this time indicates the numerical difference between the number of command pulses CP produced from the introduction of power to the generation of the first one-revolution pulse PC, and the actual amount of movement indicated by the feedback pulses FBP measured from the motor rest position (i.e., the position from which the motor started moving upon the introduction of power) until the generation of the first one-revolution pulse PC. The capacity of the second reversible counter $RCN_2$ is chosen to agree with the number of feedback pulses FBP generated by the rotary encoder RE during one full revolution thereof. When the reversible counter $RCN_2$ counts up the command pulses CP and its content reverts to zero, therefore, the commanded position of the table at such time will correspond exactly to a grid point.

Next, when the zero-point return command ZRN goes to logical "1", the command pulses CP (now serving as zero-point return pulses) from the numerical control device NC enter the first and second reversible counters $RCN_1$ and $RCN_2$ through the AND gate $AN_1$ as before, since flip-flops $FF_1$, $FF_2$ remain in the initially reset state. This causes the table T to be transported toward the zero point (in the direction of the arrow) through an operation similar to the ordinary positioning operation described above. When the table reaches the vicinity of the zero point and the dog DG provided thereon actuates the deceleration limit switch DLS, the switch generates a deceleration signal XDL (logical "1") which opens AND gate $AN_2$ and, hence, sets flip-flop $FF_1$. The deceleration signal XDL concurrently enters the numerical control device NC, which responds by slowing down the pulse rate of the zero-point return pulses. As a result, the table T approaches the zero point at reduced speed. When the dog DG separates from the limit switch DLS, the switch reverts to its original condition, and when the content of the second reversible counter $RCN_2$ attains a value of zero, and gate an 1 closes, and the output of AND gate $AN_4$ goes to logical "1", thereby setting flip-flop $FF_2$, so that the zero-point return pulses from the NC are no longer applied to the first and second reversible counters $RCN_1$ and $RCN_2$. Ultimately, therefore, the commanded position at the time of the zero-point return operation is a grid point, with the table coming to rest after being moved by an amount equivalent to the difference between the commanded pulse number left in reversible counter $RCN_1$ and the number of feedback pulses. When the table finally comes to rest it will be precisely positioned at a grid point.

If the location of the grid point at which the content of the second reversible counter $RCN_2$ first becomes zero following the restoration of the deceleration limit switch DLS is taken as the zero point, then the table will always come to rest at said grid point regardless of the time delay of the servo system, enabling a correct zero-point return operation to be performed.

The prior-art control method for effecting the zero-point return operation described above relies upon the dog DG and deceleration limit switch DLS. Mounting the dog and limit switch on the machine tool is a very complicated operation. Also, it should be obvious from the foregoing that the table T will not come to rest exactly at the true zero point if either the deceleration limit switch or zero-point return dog is shifted from the correct position by an amount in excess of one grid pitch. For example, assume that there is a shift in the position at which the zero-point return dog DG is installed so that the deceleration signal XDL goes to logical "0" at time $t_3'$, as depicted by the dotted line in FIG. 1. When this occurs, the movable element, namely the table, is stopped at time $t_4'$, that is, at the grid point $G_1$ which is one grid point short of the zero point $G_o$, and the numerical control device will assume mistakenly that $G_1$ is the zero point. Furthermore, it may be attempted to correctly install the dog or limit switch in such a manner that the deceleration signal XDL will attain the "0" logic level between the grid points $G_o$ and $G_1$. However, if this should occur at a position extremely close to either of these grid points, as illustrated by the one-dot-and-dash and two-dot-and-dash lines in FIG. 2, a slight change in the contact between the dog and limit switch, or a change with the passage of time, may shift the position at which the signal XDL goes to logical "0" to a point outside the $G_o$ and $G_1$ limits. This would again make it impossible to achieve a correct zero-point return. When one considers that the distance between grid points is as small as two millimeters, it may be appreciated that errors in the zero-point return operation are quite common, and that adjusting the positions of the dog and limit switch is a very complex operation. In addition, there are cases where it is desired to shift the zero point to the location of an arbitrary grid point, depending upon the particular machine tool. With the conventional method, this can only be accomplished by changing the position at which the dog or limit switch is mounted. This, too, is a complicated task.

BRIEF SUMMARY OF THE INVENTION

The present invention discloses a method and apparatus for controlling the zero-point return of a movable element without relying upon a dog or limit switch.

Accordingly, an object of the present invention is to provide a method and apparatus for controlling the zero-point return of a movable element without requiring the installation of a dog or limit switch.

Another object of the present invention is to provide a method and apparatus for returning a movable element to a zero point in an accurate manner.

Still another object of the present invention is to provide a method and apparatus for controlling the zero-point return of a movable element, enabling the zero point to be changed in a simple manner.

A method and apparatus for controlling the return of a movable element of a machine tool to a predetermined grid point by controlling a movable element drive device in accordance with feedback pulses generated while the drive device is being driven to transport the movable element between grid points. The method includes the steps of specifying a position remote from the predetermined grid point by a distance which is less than the spacing between grid points, computing the deviation between the specified position and the current position of the movable element, positioning the movable element at the specified position by driving the drive device on the basis of the computed deviation and the feedback pulses, and driving the drive device at a reduced speed to stop the movable element at the first grid point encountered following the initiation of reduced-speed drive.

Other features and advantages of the invention will be apparent from the following description taken in connection with the accompanying drawings, in which like reference characters designate the same or similar parts throughout the figures thereof.

DESCRIPTION OF THE PREFERRED EMBODIMENT

Figure 4:
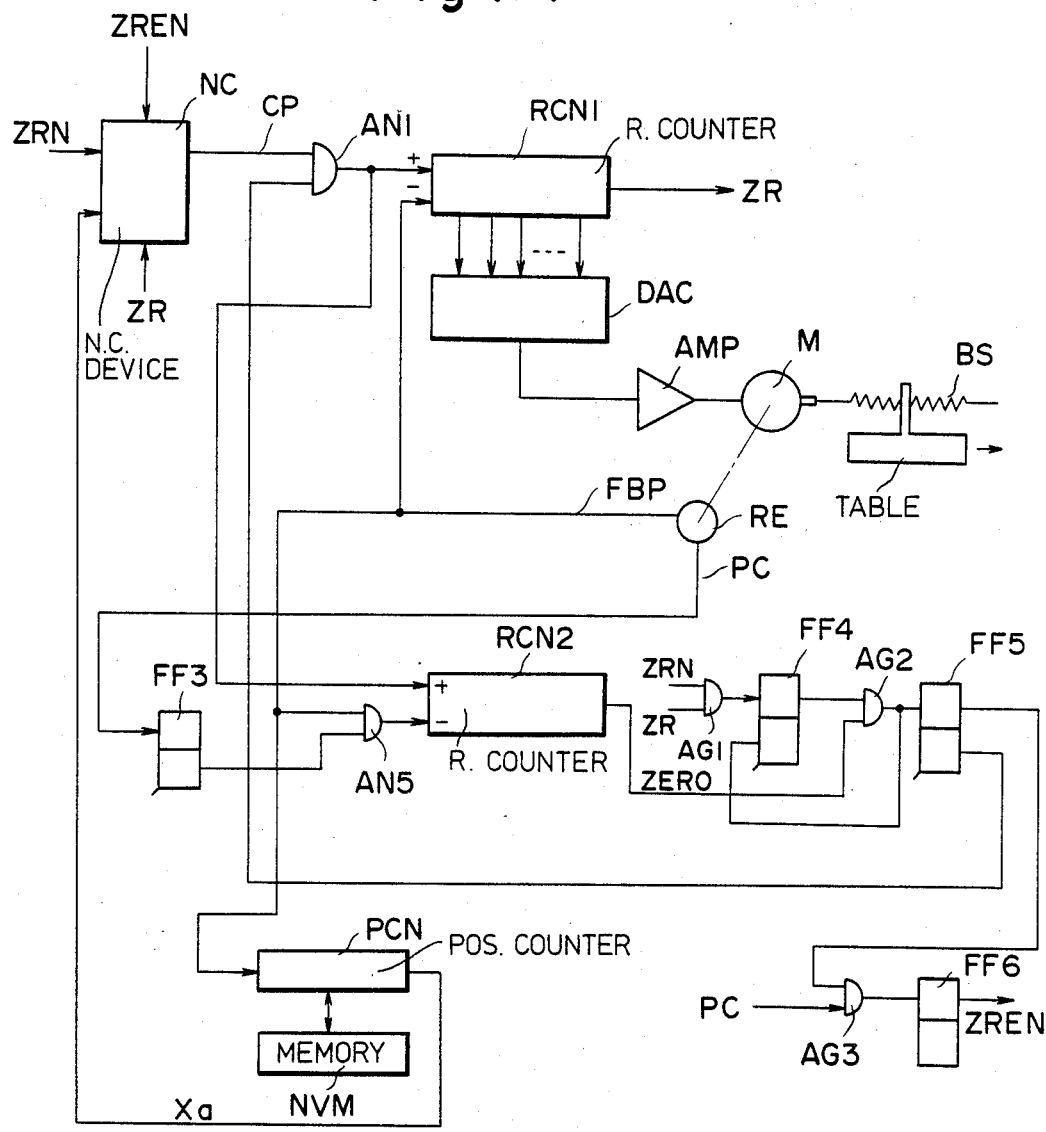
FIG. 4 is a block diagram illustrating an embodiment of an apparatus for practicing the zero-point control method of the present invention.

Referring now to FIG. 4, it will be seen that a current position counter PCN is provided to receive the feedback pulses FBP from the rotary encoder RE, the counter being adapted to count the feedback pulses reversibly in accordance with the direction of table movement to store the current position of the table. Also provided is a non-volatile memory NVM to which the content of the current position counter PCN is transferred and stored when the electric power is cut off, and from which the stored data is set in the current position counter PCN when power is introduced. $FF_4$ represents a flip-flop which is set when the content of the reversible counter $RCN_1$ becomes zero in the zero-point return mode (i.e., when the zero-point return command is logical "1"), and which is reset when the zero-point return operation ends. A flip-flop $FF_5$ is set when the content of reversible counter $RCN_2$ becomes zero. Also provided is a flip-flop $FF_6$ which is set upon the completion of the zero-point return operation. AND gates are indicated at $AG_1$, $AG_2$ and $AG_3$. The zero-point return signal ZRN, it should be noted, enters the numerical control device NC from an operator's panel, not shown. The numerical control device NC is adapted to execute the following processing in response to the signal ZRN. Specifically, when signal ZRN goes to logical "1":

(1) a positional command $X_c$ is generated, which command corresponds to a certain distance measured from the zero point $G_o$; that is, $X_c = (2M-1) L/2$, where L is the spacing between grid points and M is an integer of not less than 1;

(2) the difference x (an incremental value) is computed between the positional command $X_c$ (assumed to be an absolute command) and the current table position $X_a$ stored in the current position counter PCN;

(3) a pulse distributing operation is executed on the basis of the computed incremental value x, the resulting distributed pulses, namely the command pulses CP, are applied to the AND gate $AN_1$; and (4) zero-point return pulses of a reduced pulse rate are applied to the AND gate $AN_1$ as the command pulse CP from the time the table is positioned at the commanded position (namely $X_c$) until the time that the zero-point return operation ends, that is, until the zero point is reached.

The zero-point return operation of the present invention will now be described in detail.

Figure 1:
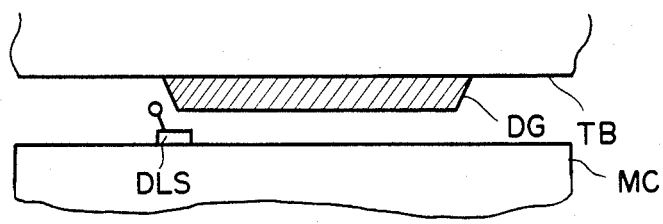
FIG. 1 is an illustrative view of a dog and limit switch arrangement for describing the method of effecting zero-point return according to the prior art.
Figure 2:
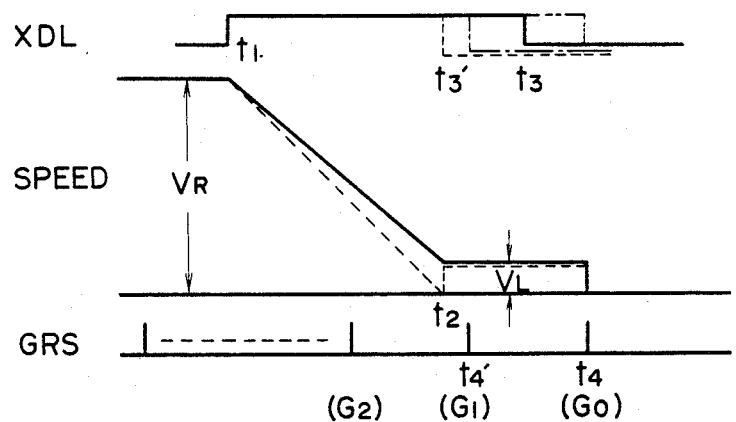
FIG. 2 is a timing chart useful in describing the conventional zero-point return control method.
Figure 3:
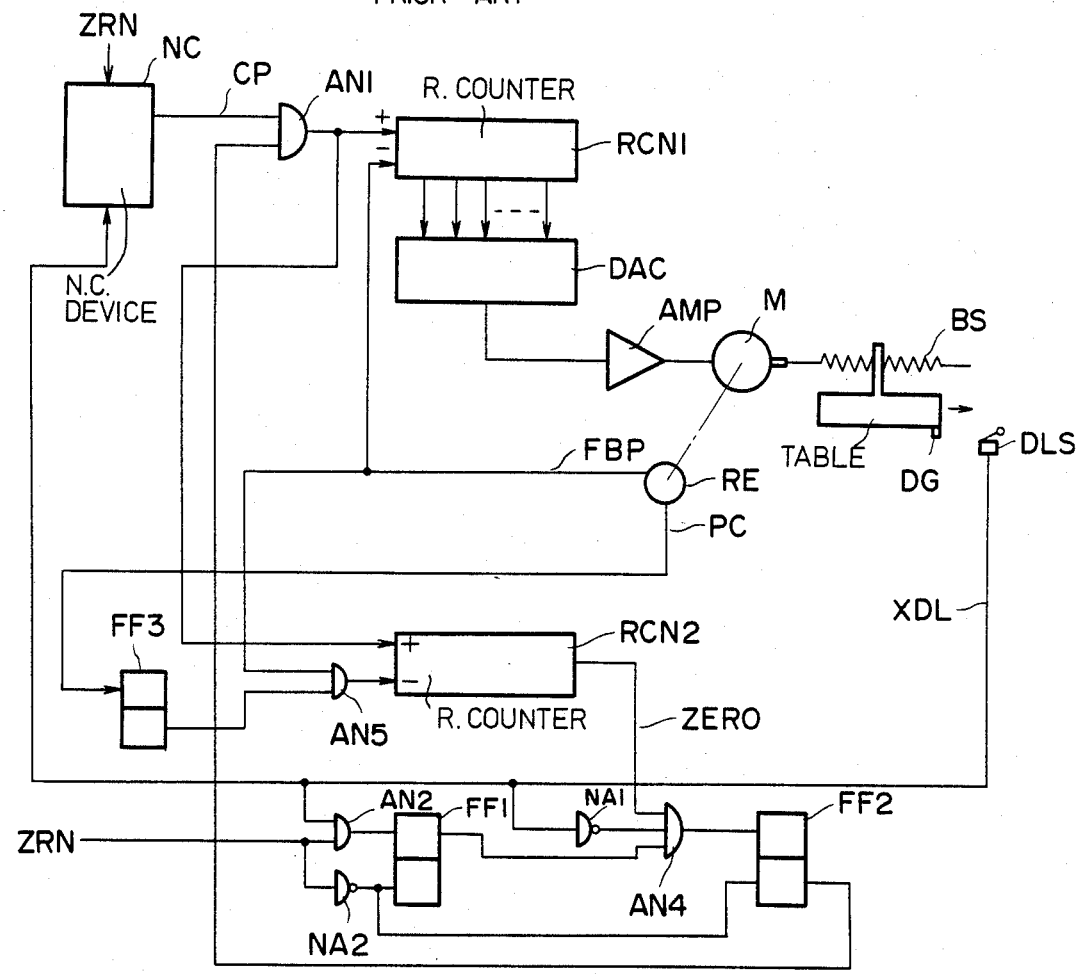
FIG. 3 is a block diagram of an apparatus for practicing the conventional zero-point return control method.
Figure 5A:
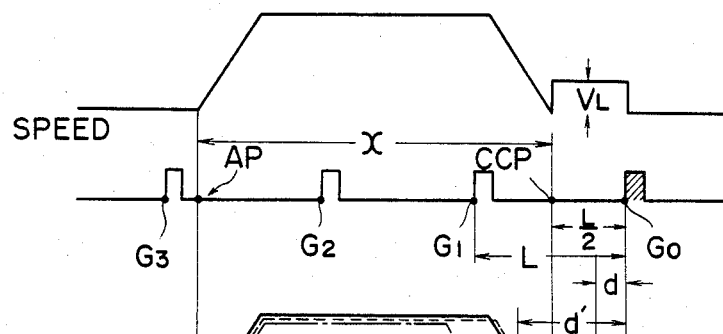
FIGS. 5(A) and 5(B) timing chart associated with the apparatus of FIG. 4.

The operator establishes the zero-point return mode by manipulating a zero-point return switch on the operator's panel (not shown). This generates the zero-point return command ZRN (i.e., ZRN goes to logical "1"). The numerical control device NC responds by executing the processing (1) through (4) described above, producing the distributed command pulses CP. We shall let M be 1 in the processing step (1) set forth above. Thus, as shown in FIG. 5(A), if we let AP designate the current table position $X_a$ and let CCP designate the above-mentioned commanded position Xhd c at a distance of L/2 from the zero point $G_o$, then the numerical control device NC computes the increment value x ($X_a - X_c$) and executes a pulse distribution operation on the basis of x to produce the distributed pulses CP. Accordingly, as already described in connection with FIG. 3, the table T is moved and positioned at the commanded position CCP at a speed indicated by the SPEED curve in FIG. 5(A). When this positioning operation is completed, the content of the first reversible counter $RCN_1$ in FIG. 4 attains a value of zero and consequently issues a zero signal ZR of a high level, namely logical "1", thereby setting flip-flop $FF_4$. Since the zero signal ZR is concurrently applied also to the numerical control device NC, the later immediately responds by producing the zero-point return pulses, at a pulse rate $V_L$, as the command pulses CP. The table starts moving again at the speed $V_L$ in accordance with the zero-point return pulses and, at a certain point in time, the content of the second reversible counter $RCN_2$ becomes zero, whereby the counter generates a zero signal ZERO, namely a signal indicating arrival at a grid point. The output of AND gate $AG_2$ goes to logical "1" as a result, thereby setting flip-flop $FF_5$. When this occurs, AND gate $AN_1$ closes, so that the command pulses from the numerical control device NC no longer enter the reversible counter $RCN_1$. Thereafter, the table T comes to rest upon traveling a distance equivalent to the difference between the commanded pulse number left in the first reversible counter $RCN_1$ and the number of feedback pulses. The position at which the table comes to rest is precisely the zero point $G_o$, where the rotary encoder RE generates the one-revolution pulse PC. The output of AND gate $AG_3$ therefore goes high, setting flip-flop $FF_6$ whose set output terminal delivers a signal ZREN indicative of the end of the zero-point return operation.

Figure 5B:
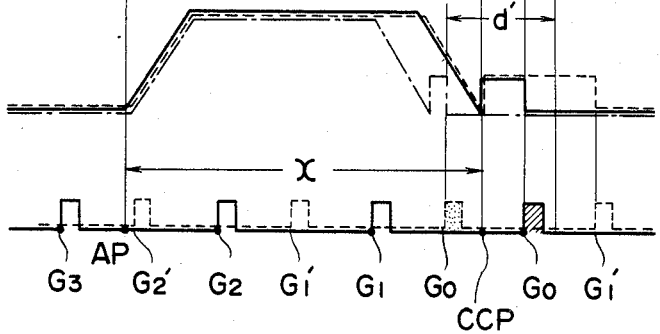

It should be noted that there are cases where the table may be displaced after to a cut off of electric power, meaning that the data stored in the non-volatile memory NVM will no longer represent the current position of the table. With the present invention, however, the table can still be accurately restored to the zero point after power is re-introduced. This will be explained with reference to FIGS. 4 and 5.

We will assume that the movable element, namely the table T, has been shifted by a distance d (FIG. 5) owing to the cut off of power. To simplify the description, this situation will be illustrated in the form shown in FIG. 5(B), in which the current position AP of the movable element is taken as being stationary and the grid points $G_o, G_1, \ldots$ are shifted by the distance d from the grid points of FIG. 5(A).

When power is re-introduced, the current position stored in the non-volatile memory NVM is transferred to the current position counter PCN. Thereafter, when the zero-point return mode is established and the zero-point return command ZRN enters the numerical control device NC the table is restored to the zero point (grid point $G_o$) through the series of operations described above. (Refer to the solid line in FIG. 5(B)).

Next, assume that the numerical control device NC responds to the command ZRN to generate a signal indicative of L/2 as the positional command $X_c$, as in the above-described case, but that the movable element has been shifted by a distance d', which is greater than L/2, owing to the interruption in power. When such is the case, the movable element will not stop at the zero point (indicated as the grid point $G_o$, due to the displacement d') but will instead stop one grid beyond, namely at $G_{-1'}$, as indicated by the dashed line in FIG. 5(B). Thus the movable element cannot be returned to the correct zero point. The reason is that the commanded position CCP overshoots the zero point $G_o'$ following the movement of the table caused by the interruption in power. In other words, in a case where the table has been shifted closer to the zero point by a distance d' (L/2 < d' < L) owing to the cut off in power, it is required that the numerical control device NC respond to the zero-point return command ZRN by internally issuing a positional command $L_o$ which satisfies the relation $d' < L_o < (L + d')$. This will correctly stop the table at the zero point $G_o'$, as shown by the one-dot-and-dash line in FIG. 5(B).

Thus, when cutting of electric power causes the table to move by a distance of less than L/2 (one-half the grid spacing) in either the positive or negative direction, the numerical control device NC responds to the zero-point return command ZRN by internally issuing, a positional command indicative of a position mid-way between the first two grid points, whereby the table can be stopped correctly at the zero point. In a case where the table is moved closer to the zero point by the distance d' (L/2 < d' < L) owing to the cut off in power, the numerical control device NC need only respond to the command ZRN by internally issuing a positional command $L_o$ which satisfies the relation $d' < L_o < (L + d')$. If the table is moved away from the zero point by the distance d' (L/2 < d' < L), on the other hand, then the numerical control device must issue a command $L_o$ satisfying the relation $(L - d') > L_o > -d'$. In a case where the table is moved in excess of one-half the grid spacing, therefore, it is necessary to sense the direction in which the table has been moved by the interruption in power, and to issue a move command in accordance with said direction. Ordinarily, grid spacing is 2 mm, and the amount of table movement caused by cutting off power is L/2 (1 mm) or less. It suffices, then, if the NC issues L/2 as the positional command in response to the zero-point return command ZRN.

In the foregoing a case has been described where the numerical control device NC issues L/2 as the positional command in response to the zero-point return command ZRN. It should be noted, however, that the zero-point return position can be shifted M-number of grid points to the left or right by issuing $(2M+1)\cdot L/2$ as the positional command where $M = \pm 1, =2, \ldots$ In accordance with the present invention as described hereinabove, a movable member such as table can be returned accurately to a zero point without relying upon dogs, limit switches or the like. Moreover, the position to which the movable element is returned can be shifted M-number of grid points to the left or right depending upon the positional command issued in response to a zero-point return command.

It should be noted that the position located one-half grid spacing short of the zero point is set in the numerical control device by the program or by means of parameters.

As many apparently widely different embodiments of the present invention can be made without departing from the spirit and scope thereof, it is to be understood that the invention is not limited to the specific embodiments thereof except as defined in the appended claims. In the embodiment illustrated and described hereinabove, for example, a servo system is employed. However, a circuit arrangement other than one which relies upon servo techniques may be adopted with the same effects.

What we claim is:

1. A method of controlling the return of a movable element of a machine tool to a predetermined grid point by controlling movable element drive means in accordance with feedback pulses generated while said drive means is being driven to transport said movable element between grid points, comprising the steps of:
   specifying a position remote from said predetermined grid point by a distance which is less than the spacing between grid points;
   computing a single deviation between said specified position and a current position of the movable element;
   driving, positioning and stopping said movable element at said specified position by driving said drive means on the basis of the computed deviation and the feedback pulses; and
   driving said drive means, after stopping at said specified position, at reduced speed to stop said movable element at the first grid point encountered following the initiation of reduced-apeed drive, thereby stopping at said predetermined grid point after two drive periods.

2. A method according to claim 1, wherein the step of computing said deviation includes a step of finding the current position of said movable element on the basis of said feedback pulses.

3. A method according to claim 1, wherein said predetermined grid point is a zero point of the machine tool.

4. A method according to claim 1, wherein the step of positioning said movable element includes the steps of:
   subtrating said feedback pulses from said deviation; and
   driving said drive means in accordance with the value resulting from said subtraction operation.

5. An apparatus for controlling the return of a movable element of a machine tool to a predetermined grid point by controlling movable element drive means in accordance with feedback pulses generated by an encoder operatively connected to said movable element, while said drive means is being driven to transport said movable element between grid points, said apparatus comprising:
   a current position counter, operatively connected to said encoder for sensing and storing the current position of said movable element;
   control means, operatively connected to said current position counter, for specifying a position remote from said predetermined grid point by a distance which is less than the spacing between grid points, and for producing a signal indicative of the deviation between said specified position and the current position of the movable element stored in said current position counter;
   a driving circuit, operatively connected to said control means, said encoder, and said drive means, for driving said drive means on the basis of the difference between said signal indicating the deviation and said feedback pulses, and for providing said control means with a reduced speed signal when said difference attains a value of zero; and
   an inhibit circuit, operatively connected to said driving circuit and said control means, for inhibiting the delivery of said reduced speed signal to said control means in order to stop said movable element at the first grid point encountered after the generation of said reduced speed signal.

* * * * *

UNITED STATES PATENT AND TRADEMARK OFFICE
CERTIFICATE OF CORRECTION

PATENT NO. : 4,513,234                    Page 1 of 2
DATED      : April 23, 1985
INVENTOR(S): RYOICHIRO NOZAWA ET AL.

It is certified that error appears in the above-identified patent and that said Letters Patent is hereby corrected as shown below: on the title page;

[56] References Cited line 6, after "al." insert --G06F 7/02--;

Col. 1, line 39, "said" should be --the--.

Col. 2, line 65, "and" should be --AND--;

"an 1" should be --$AN_1$--.

Col. 3, line 1, "$RCN_1$and" should be --$RCN_1$ and--;

line 43, "$G_o$and" should be --$G_o$ and--;

line 58, delete "BRIEF".

Col. 4, line 40, "timing chart" should be --are timing charts--;

line 64, "$AG_2$and" should be --$AG_2$ and--;

UNITED STATES PATENT AND TRADEMARK OFFICE
CERTIFICATE OF CORRECTION

PATENT NO. : 4,513,234

DATED : April 23, 1985

INVENTOR(S) : RYOICHIRO NOZAWA ET AL.

Page 2 of 2

It is certified that error appears in the above-identified patent and that said Letters Patent is hereby corrected as shown below:

Col. 5, line 8, "x" should be --$\underline{x}$--;

line 13, "x," should be --$\underline{x}$--;

line 34, "Xhd c" should be --Xc--;

line 36, "x" should be --$\underline{x}$--;

line 38, "x" should be --$\underline{x}$--;

line 48, "later" should be --latter--.

Col. 6, line 4, delete "to";

line 12, "d" should be --$\underline{d}$--;

line 17, "d" should be --$\underline{d}$--;

line 36, "$G_{-1}$.," should be --$G_{-1}'$,--.

Col. 7, line 15, "2," should be --$\pm$ 2--;

Col. 8, line 6, "reduced-apeed" should be --reduced-speed--.

Signed and Sealed this

Twenty-second Day of October 1985

[SEAL]

Attest:

DONALD J. QUIGG

Attesting Officer

Commissioner of Patents and
Trademarks—Designate